Aug. 8, 1961    G. PANERAI ET AL    2,995,640
DEVICE FOR CONTROLLING FROM OUTSIDE A MECHANICAL OR ELECTRICAL
MEMBER CONTAINED IN A PRESSURE TIGHT BOX OR CONTAINER, WITH
NO ELEMENT PASSING THROUGH THE BOX
Filed Aug. 28, 1957
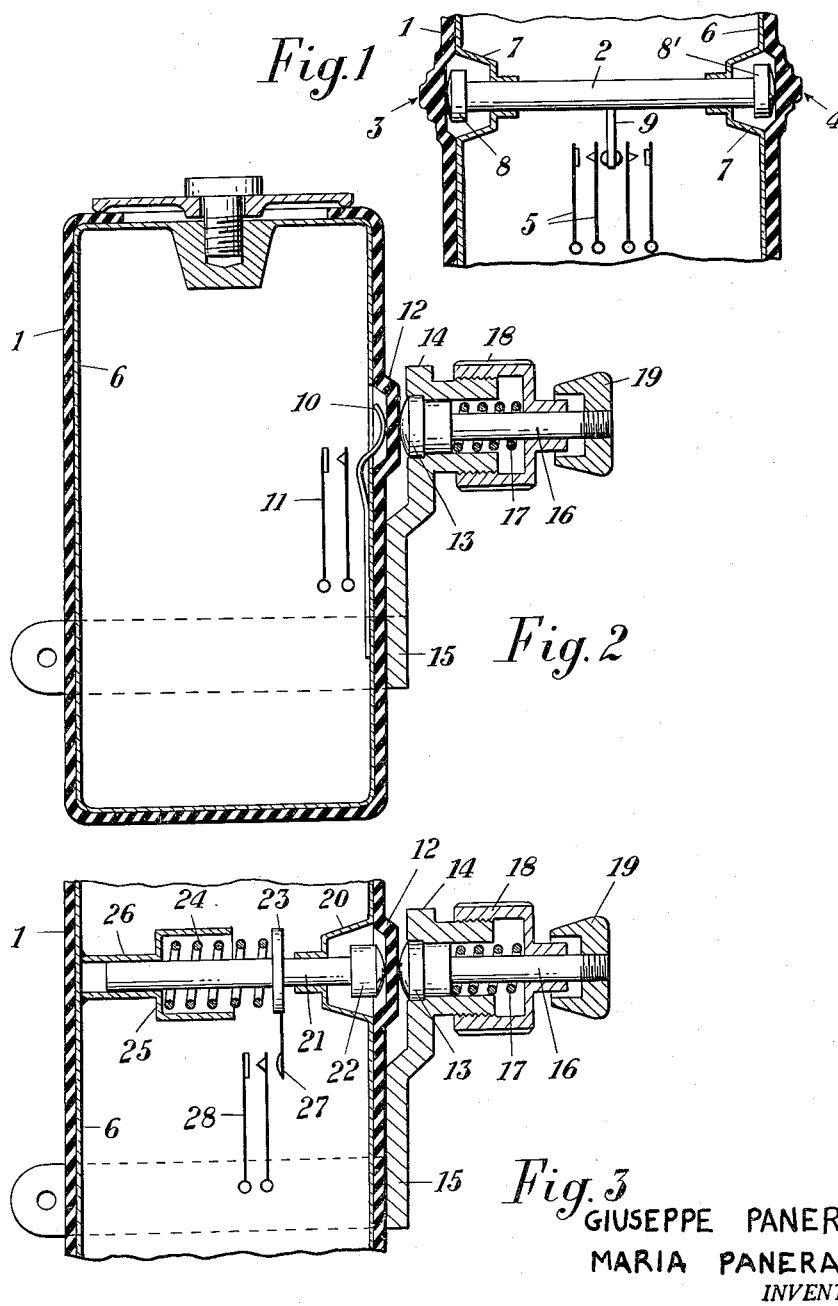
GIUSEPPE PANERAI
MARIA PANERAI
INVENTORS
Attys

United States Patent Office 2,995,640
Patented Aug. 8, 1961

2,995,640
DEVICE FOR CONTROLLING FROM OUTSIDE A MECHANICAL OR ELECTRICAL MEMBER CONTAINED IN A PRESSURE TIGHT BOX OR CONTAINER, WITH NO ELEMENT PASSING THROUGH THE BOX
Giuseppe Panerai and Maria Panerai, both of No. 2 Piazza Galileo Ferraris, Florence, Italy
Filed Aug. 28, 1957, Ser. No. 680,833
Claims priority, application Italy Nov. 14, 1956
3 Claims. (Cl. 200—168)

The present invention relates to an improvement in the devices for the control of an elastic or mechanical member contained within a pressure tight box from outside the box, without use of passages protected by stuffing boxes or similar seals.

The purpose of this invention is to provide such a control system while maintaining the integrity of the box in which the controlled members are contained and therefore prevents fluid from outside the box from reaching these members so as to damage them.

Another purpose of this invention is to provide a control which, although having the aforedescribed characteristic, permits presetting the control so that the device inside the box has no tendency to move under the pressure acting from outside until said pressure reaches a predetermined value. It is to be noted, in this connection that the boxes are generally used in an ambient atmosphere wherein the prevailing pressure may increase, for instance due to a given movement of the box in the ambient atmosphere.

Some preferred embodiments of this invention will be disclosed only by way of example and in a diagrammatical way, with reference to the attached drawings, wherein:

FIG. 1 is a partial axial sectional view of a first embodiment of the device according to this invention;

FIG. 2 is an axial sectional view of a second embodiment of the invention;

FIG. 3 shows a cross-sectional view similar to that of FIGS. 1 and 2, of a detail of a third embodiment of this invention.

With reference to the drawings, and particularly to FIG. 1, the box 6 is covered with an elastic membrane 1. This box is provided with the sleeves 7 which slidably support a stem 2 having expanded heads 8 and 8' in contact with the inner side of the elastic membrane 1, covering the box 6. Only by way of example, the stem 2 may be provided with an arm 9 to control the inner electrical contacts 5. Obviously, if the heads 8 and 8' are equal to one another, the stem 2 is in equilibrium with respect to the pressure of the atmosphere surrounding the box, while the stem can be easily axially moved in either direction by a pressure applied from outside, either manually or by any suitable means (not shown), against one of the outer elements of the membrane 3 or 4.

If, on the contrary, easy operation is desired when the box is submitted to a pressure having a predetermined value, according to this invention use is made of the means as hereinafter disclosed; in this case, in order to provide for a particular presetting force to be overcome when a predetermined pressure has been reached, one of the heads, for instance that shown at 8 can be larger than the head 8', so that the stem automatically assumes, due to action of the surrounding pressure, a position wherein the head 8' projects from the box, so that to center the stem, or to move the latter in the reverse direction, a pressure will have to be applied from outside on the smaller head, in an amount proportional to the difference between the operative areas of the two heads and to the outside prevailing pressure.

If the outside pressure cannot be used for self-acting or presetting purposes, for instance because the inner member to be controlled is accessible from one side only, the arrangement adopted can be similar to that shown at FIG. 2. Inside the box, which is denoted also in this case by the reference numeral 6 and is protected by the elastic membrane 1, a spring 10 is arranged which has its free end resting against the elastic lining in the control zone 12. Outside of that zone is positioned the plunger 13 which bears against a support 14, carried on a bracket 15 on the outside of the box 6. The plunger 13 cannot move backwards. The spring 10 is set for the maximum pressure which is expected to be applied by the fluid outside the membrane, so that this spring does not move under such a pressure. Said spring on the contrary is moved when a further pressure is applied on the plunger 13. In order to avoid the necessity of applying an excessive force to the plunger 13, when the pressure outside the membrane diminishes or in absence of said pressure, a spring 17 is provided surrounding the shank 16 and contained within the threaded sleeve 18 on the outside of the support 14; since said spring is confined between the head of the plunger 13 and the bottom of the sleeve 18 the presetting tension of said spring may be changed by threading the sleeve 18 onto the support 14. The shank 16 is operated by the outer knob 19. The spring 17 has a strength such that the pressure exerted by the latter plus the pressure of the outer fluid are in total slightly less, in the normal conditions of use, than the force exerted by the spring 10 inside the box.

In this case a slight pressure applied to the knob 19 is sufficient to move the inner spring 10 in order to bring about the desired action which may be, for instance, the control of a switch 11.

FIG. 3 shows a further embodiment, also by way of example, of the device according to this invention. It is to be noted, in connection with this figure that an outer control knob has been shown which corresponds exactly to that disclosed with reference to FIG. 2. Therefore the reference numerals have been used to denote the corresponding parts, and for their construction and operation reference is to be made to the aforesaid disclosure.

In this embodiment, the box 6 is provided with an inner bushing 20 through which passes the stem 21. Stem 21 has the head 22 bearing against the zone 12 of the outer membrane 1.

The stem 21 is provided with a collar 23 against which rests the end of a spring 24 the other end of which bears against a shoulder 25 of a sleeve 26 rigidly connected to the box 6, and in which sleeve 26 the end of the stem 21 may glide. The collar 23 has a member 27 mounted thereon for operating a switch 28. The operation of the unit corresponds exactly to that of the previously described embodiment, and the spring 24 has a strength such that the stem 21 is in equilibrium either at the normal service pressure, so that the knob 19 is usually used to control the switch 28, or out of equilibrium to define either a time or a position at which easy control action by the knob 19 will start, or a time or position at which automatic control occurs, i.e. when a given pressure outside the membrane 1 has been reached.

We claim:
1. A device for controlling a member contained in a pressure tight container from outside the container, the device being for operation in a space subjected to varying pressures, the device comprising in combination a hermetically sealed casing, said casing having an aperture therein, an actuating member on the inside of the said casing, said actuating member comprising a flat spring secured to the inside of said casing adjacent said aperture and having a curved end portion projecting into said aperture, a membrane on the outside of said casing over said aperture and sealing said aperture, a plunger housing on the outside of said casing, said plunger housing comprising two parts, one threadedly and telescopically engaged with the other, a plunger mounted in said housing in alignment with said aperture, a knob at the end of the plunger for operating the plunger, and adjustable spring means positioned in said housing between one of said parts and said plunger, said spring means bearing on said plunger and urging said plunger toward said aperture for exerting pressure on said curved end portion of the said flat spring inside the casing through the said membrane.

2. A device for controlling a member contained in a pressure tight container from outside the container, the device being for operation in a space subjected to varying pressures, the device comprising in combination a hermetically sealed casing, said casing having an aperture therein, an actuating member on the inside of said casing extending into said aperture, said actuating member comprising a rod having a collar and a head thereon, said rod being slidably mounted in said casing for sliding movement in alignment with said aperture and a spring bearing on said collar urging said rod toward said aperture, a membrane on the outside of said casing over said aperture and sealing said aperture, a plunger housing on the outside of said casing, said plunger housing comprising two parts, one threadedly and telescopically engaged with the other, a plunger slidably mounted in said housing in alignment with said aperture, a knob mounted on the end of the plunger, adjustable spring means positioned in said housing between one of said parts and said plunger, said spring means bearing on said plunger and urging said plunger toward said aperture for pressing the said rod into the said casing, the spring bearing on the collar of the said rod being dimensioned for balancing the pressure exerted on the head of the rod by the said adjustable spring means positioned in the said housing.

3. A device as claimed in claim 2 wherein the spring bearing on the collar of the rod is dimensioned with respect to the adjustable spring means in said housing for allowing the operation of the rod only under the action of the pressure in the space surrounding the said casing.

References Cited in the file of this patent

UNITED STATES PATENTS

| | | |
|---|---|---|
| 1,789,017 | Munthesen | Jan. 13, 1931 |
| 2,040,919 | Caldwell | May 19, 1936 |
| 2,213,649 | Goodwin | Sept. 3, 1940 |
| 2,750,480 | Freeman | June 12, 1956 |